No. 626,309. Patented June 6, 1899.
C. S. SMITH.
FLUSH JOINT FOR TUBULAR BICYCLE FRAMES.
(Application filed Dec. 14, 1896.)
(No Model.)
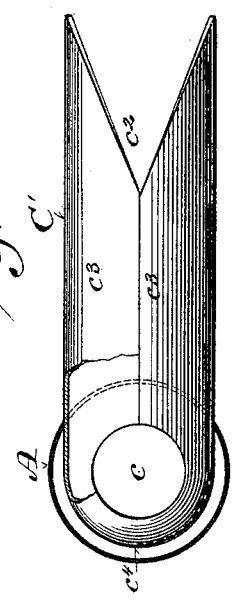
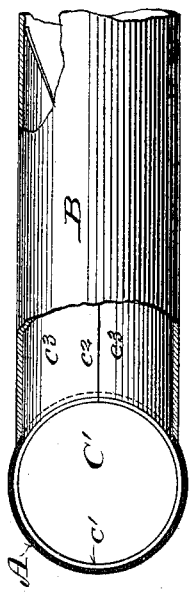
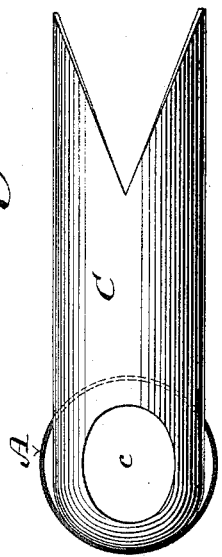
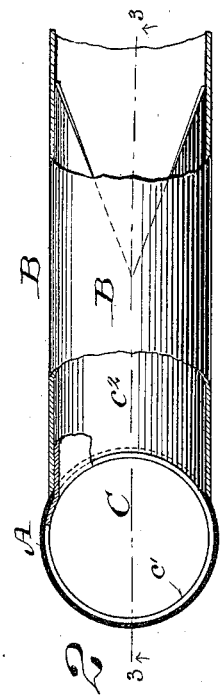
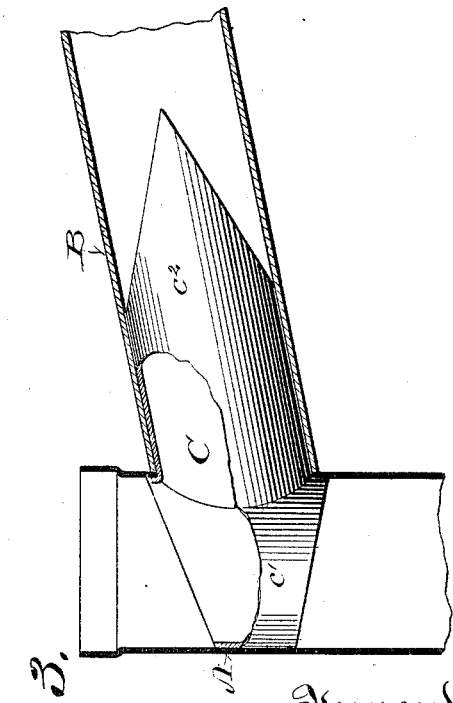
Witnesses:
Geo. W. Young.
Chas. L. Goss.
Inventor:
Charles S. Smith,
By Winter Knauss Smith Bottum & Vilas
Attorneys.

UNITED STATES PATENT OFFICE.

CHARLES S. SMITH, OF MILWAUKEE, WISCONSIN.

FLUSH JOINT FOR TUBULAR BICYCLE-FRAMES.

SPECIFICATION forming part of Letters Patent No. 626,309, dated June 6, 1899.

Application filed December 14, 1896. Serial No. 615,587. (No model.)

*To all whom it may concern:*

Be it known that I, CHARLES S. SMITH, of Milwaukee, in the county of Milwaukee and State of Wisconsin, have invented certain new and useful Improvements in Flush Joints for Tubular Bicycle-Frames; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to produce a flush joint between the parts of a tubular bicycle-frame.

It consists of certain novel features in the joint and in the method of making it, hereinafter particularly described, and pointed out in the claims.

In the accompanying drawings like letters designate the same parts in the several figures.

Figure 1 is a plan view of a part of my improved joint in process of construction. Fig. 2 is a sectional view of the finished joint. Fig. 3 is a section of the joint on the line 3 3, Fig. 2; and Figs. 4, 5, and 6 illustrate a modification of the joint and the method of constructing it, Fig. 4 being an internal view of the internal fitting or connection spread out, Fig. 5 a view of the fitting folded and inserted at one end into a lateral opening in one of the frame members to be joined, and Fig. 6 a sectional view of the finished joint.

For the purpose of illustration I have shown my improved joint in connection with the head and upper reach of an ordinary diamond-shaped bicycle-frame, although it is applicable to any tubular structure where one member is to be joined endwise to the side of another member.

Referring to Figs. 1 to 3, inclusive, A designates the upper portion of the head, and B the front portion of the upper reach, of a tubular metallic bicycle-frame. The head A is formed in one side with an opening corresponding in size and shape with the bore of the reach B, which is fitted at one end to abut snugly against the side of the head around said opening. C is an internal sheet-metal fitting or connection, which in the present instance is drawn into the form of a tube which fits into the tubular frame member or reach B and is perforated transversely at or near its closed end with holes $c$, somewhat smaller in diameter than the diameter of the tube. This end of the fitting is inserted through the lateral opening in the member or head A of the frame, as shown in Fig. 1. It is then expanded by a mandrel or other suitable tool in the tubular head A to snugly fit the bore thereof, as shown in Figs. 2 and 3. The internal fitting or connection C consists, when thus completed, of two seamless cylindrical parts $c'$ $c^2$, formed integrally with and intersecting each other at an angle corresponding with the angle between the members of the frame to be joined, one part $c'$ fitting the interior of the frame member A and the other part $c^2$ fitting the interior of member B. The parts being assembled as shown in Figs. 2 and 3 are brazed together, thus forming a flush joint between the two frame members without external shoulders or projections on either member, such as are produced by the external couplings or fittings commonly employed for this purpose. The end of part $c^2$ of the fitting which is inserted in member B is notched, as shown, to graduate or distribute the vibration of the tube.

Referring to Figs. 4 to 6, showing a modification of the joint and the method of making it, C' designates the internal fitting or connection, which in this case is made from sheet metal, but wrapped or folded instead of being drawn into the desired form. It is first formed at its ends into two semicylindrical portions $c^3$, which when brought together produce the part corresponding with that designated $c^2$ in Figs. 2 and 3, which is to be inserted in member B of the frame. The intermediate portion $c^4$ of the fitting, which may be made flat or concave in continuation of the concave end portions $c^3$ in the first instance, constitutes the part corresponding with that designated $c'$ in Figs. 2 and 3. It is inserted, as shown in Fig. 5, through the lateral opening in the tubular member A and is expanded to fit the interior thereof, as shown in Fig. 6. The parts being assembled as shown in Fig. 6 are brazed together, thereby forming a joint like in appearance and similar in construction to that previously described. This construction of the joint, however, is better adapted for joining the members of a tubular frame at an acute angle; but in either case a complete ring or sleeve is produced to fit the interior of the tube A and ample brazing-surface is afforded for securely attaching the fitting to both frame members connected thereby.

With seamless tubing it has been a difficult matter to produce light and strong flush joints for connecting frame members at various angles with the end of one member adjoining or abutting against the side of another between its ends, and it is the primary purpose of my improved construction to successfully and economically accomplish this end.

I claim—

1. The combination with two tubular frame members one abutting at the end against the other which is seamless and jointless and has between its ends in the side a hole corresponding with the internal diameter of the abutting member, of an internal fitting consisting of two integrally-formed tubular parts, one of which is fitted inside of one of the members while the other projects through the lateral opening therein into the end of the other member, substantially as and for the purposes set forth.

2. The combination with two tubular frame members, one being seamless and jointless and having between its ends a lateral hole corresponding with the internal diameter of the other member, which is fitted at the end to the first member around said hole, of an internal hollow metal fitting comprising two parts formed integrally with each other, one part being expanded and fitted inside of the frame member having the lateral hole, and the other part projecting through said hole into and being fitted and secured in the abutting end of the other frame member, substantially as and for the purposes set forth.

In testimony that I claim the foregoing as my own I affix my signature in presence of two witnesses.

CHARLES S. SMITH.

Witnesses:
EDW. R. WAGNER,
CHAS. L. GOSS.